United States Patent
Guering et al.

(10) Patent No.: US 11,319,696 B2
(45) Date of Patent: May 3, 2022

(54) CONVERTIBLE AIRCRAFT TOILET

(71) Applicant: Airbus Operations SAS, Toulouse (FR)

(72) Inventors: Bernard Guering, Montrabe (FR); Romain Delahaye, Colomiers (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 22 days.

(21) Appl. No.: 16/725,324

(22) Filed: Dec. 23, 2019

(65) Prior Publication Data

US 2020/0208382 A1 Jul. 2, 2020

(30) Foreign Application Priority Data

Dec. 27, 2018 (FR) ........................... 1874236

(51) Int. Cl.
 *E03C 1/01* (2006.01)
 *B64D 11/02* (2006.01)

(52) U.S. Cl.
 CPC ............... *E03C 1/01* (2013.01); *B64D 11/02* (2013.01)

(58) Field of Classification Search
 CPC ..... E03C 1/01; E03C 1/32; E03C 1/33; E03C 1/324; E03C 2201/90; B64D 11/02; A47C 16/025
 USPC .......................................................... 4/664
 See application file for complete search history.

(56) References Cited

U.S. PATENT DOCUMENTS

| | | | | |
|---|---|---|---|---|
| 345,890 A * | 7/1886 | Farson | .................. | A47K 11/04 4/420.3 |
| 1,480,145 A * | 1/1924 | Berven | .................. | A47K 1/02 4/627 |
| 2,375,090 A * | 5/1945 | Pearson | .................. | E03C 1/14 4/665 |
| 2,495,201 A * | 1/1950 | Snowball | .................. | E03C 1/01 4/664 |
| 2,907,048 A * | 10/1959 | Gould | .................. | E03C 1/01 4/663 |
| 2,983,230 A | 5/1961 | Murphy | | |
| 3,209,371 A * | 10/1965 | Small | .................. | E03C 1/01 52/34 |
| 4,177,527 A * | 12/1979 | Uhlig | .................. | A47K 4/00 292/123 |
| 4,232,901 A * | 11/1980 | Harrington | .......... | A47C 16/025 297/423.45 |

(Continued)

FOREIGN PATENT DOCUMENTS

DE 102007007020 A1 8/2008
DE 102016107672 A1 10/2017
(Continued)

OTHER PUBLICATIONS

French Search Report; priority document.

*Primary Examiner* — Benjamin R Shaw
(74) *Attorney, Agent, or Firm* — Greer, Burns & Crain, Ltd.

(57) ABSTRACT

To reduce the bulk of an aircraft toilet which includes a toilet bowl and a washbasin, the washbasin is movably mounted in the toilet to be able to adopt at least two distinct positions relative to the toilet bowl, including a retracted position adopted to bring the toilet into a configuration of use of the bowl, and a deployed position adopted to bring the toilet into a washbasin configuration, a position in which the washbasin is arranged above the bowl.

17 Claims, 5 Drawing Sheets

(56) References Cited

U.S. PATENT DOCUMENTS

| | | | | |
|---|---|---|---|---|
| 4,718,131 | A * | 1/1988 | Kitamura | A47K 4/00 |
| | | | | 4/307 |
| 4,884,767 | A * | 12/1989 | Shibata | B64D 11/02 |
| | | | | 244/118.5 |
| 5,742,956 | A | 4/1998 | Tarver | |
| 5,867,847 | A * | 2/1999 | Klawitter | E03C 1/324 |
| | | | | 4/645 |
| 6,631,524 | B1 * | 10/2003 | Dixon | A47C 16/025 |
| | | | | 297/423.45 |
| 7,984,875 | B2 * | 7/2011 | Koehn | B64D 45/0028 |
| | | | | 244/118.5 |
| 8,040,257 | B2 * | 10/2011 | Ferro | B64C 1/1469 |
| | | | | 340/945 |
| 2005/0230550 | A1 * | 10/2005 | Dominguez | B64C 1/1469 |
| | | | | 244/129.5 |
| 2006/0169839 | A1 * | 8/2006 | French | B64D 45/0028 |
| | | | | 244/118.5 |
| 2009/0126101 | A1 | 5/2009 | Le | |
| 2014/0097294 | A1 * | 4/2014 | Boren | B64D 11/02 |
| | | | | 244/118.5 |
| 2014/0359934 | A1 * | 12/2014 | Schliwa | B64D 11/02 |
| | | | | 4/664 |
| 2017/0121025 | A1 * | 5/2017 | Ooi | B64D 11/02 |

FOREIGN PATENT DOCUMENTS

| | | |
|---|---|---|
| JP | 2004353211 A | 12/2004 |
| WO | 2015151308 A1 | 10/2015 |

\* cited by examiner

CONVERTIBLE AIRCRAFT TOILET

CROSS-REFERENCES TO RELATED APPLICATIONS

This application claims the benefit of the French patent application No. 1874236 filed on Dec. 27, 2018, the entire disclosures of which are incorporated herein by way of reference.

FIELD OF THE INVENTION

The invention relates to the field of aircraft toilets and, in particular, to toilets integrated into the nose section of the aircraft.

The invention preferably applies to commercial aircraft.

BACKGROUND OF THE INVENTION

A plurality of toilets, also referred to as toilet booths, are generally provided on an aircraft. Each toilet usually includes at least one toilet bowl and a washbasin.

These toilets occupy a space that reduces the floor area of the cabin zone in which the passengers are located. There consequently exists a need to optimize the design of existing toilets so as to reduce their footprint and to increase commensurately the floor area of the cabin zone.

SUMMARY OF THE INVENTION

To respond at least partly to this need, the invention firstly comprises an aircraft toilet comprising a toilet bowl and a washbasin, the washbasin being movably mounted in the toilet so as to be able to adopt at least two distinct positions relative to the toilet bowl, including:
 a retracted position adopted to bring the toilet into a configuration of use of the bowl;
 a deployed position adopted to bring the toilet into a washbasin configuration, a position in which the washbasin is arranged above the bowl.

The toilet is moreover designed so that the washbasin pivots downwards to go from its deployed position to its retracted position.

The mobile character of the washbasin enables the toilet to be converted between the configuration of use of the toilet bowl and the washbasin configuration. This advantageously reduces the footprint of the toilet, while offering functionalities at least identical to the existing ones. The cabin zone in which the passengers are located is therefore extended, leading to greater profitability of the aircraft. Moreover, the design with the washbasin tilting downwards from its deployed position to its retracted position also makes a considerable contribution to reducing the overall size of the washbasin when it adopts its retracted position. In fact, in the usual layout of a toilet in an aircraft, namely in the upper part of the fuselage rather than the lower part, the curvature seen in the fuselage makes more space available close to the floor of the toilet than close to the ceiling. In the retracted position the washbasin tilted downwards is therefore closer to the floor of the toilet, where the width of the toilet is usually greater than at the ceiling.

With tilting of this kind as proposed by the invention, the washbasin in the retracted position is therefore advantageously accommodated in a wider zone, thereby optimizing the overall size.

The invention preferably has at least one of the following optional technical features, separately or in combination.

The washbasin forms an integral part of a washbasin module also equipped with a washbasin table, the washbasin module being mounted to be mobile so as to be able to adopt said at least two distinct positions relative to the toilet bowl, also by tilting downwards to go from the deployed position to the retracted position.

The toilet comprises a roller blind featuring a fixed cassette arranged to the rear of the toilet bowl and a blind edge fastened to a front part of the washbasin table.

The washbasin module is equipped with a washbasin cover mounted to be mobile relative to the washbasin table so as to be able to adopt two distinct positions, including:
 a position covering the washbasin enabling formation, conjointly with the washbasin table, a baby changing table;
 a retracted position giving access to the washbasin.

The washbasin module is also equipped with a tap, preferably mounted to be mobile so as to be able to adopt two distinct positions relative to the washbasin, including:
 a retracted position rendering the tap inaccessible;
 a position for use of the tap.

The washbasin module is mounted to be mobile on a shelf that forms an extension of the washbasin table when the module adopts its deployed position.

The shelf is mounted on a rear wall of the toilet in a fixed or vertically mobile manner.

The washbasin module is mounted to be mobile in rotation, preferably about a rotation axis parallel to a transverse direction of the toilet bowl.

In the retracted position of the washbasin module the washbasin table is situated behind the toilet bowl, preferably arranged vertically.

The toilet comprises a lid covering the toilet bowl, the lid preferably having a rectangular general shape the length of which is oriented transversely relative to the toilet bowl.

The toilet includes a floor comprising a height-adjustable footrest.

The toilet is configured so that the footrest is adjustable in height by the user and/or automatically as a function of the angle form at the level of the knees of the user sitting on the toilet bowl.

The toilet is equipped with a drive system enabling the washbasin to be moved into each of its distinct positions.

The invention also comprises an aircraft nose section comprising at least one toilet as described, the toilet comprising a rear wall the shape of which preferably follows the profile of the double curvature fuselage portion covered by this toilet rear wall.

Finally, the invention relates to an aircraft comprising this kind of nose section and/or at least one toilet as described above.

Other advantages and features of the invention will become apparent in the following nonlimiting detailed description.

BRIEF DESCRIPTION OF THE DRAWINGS

The description will be given with reference to the appended drawings, in which.

DETAILED DESCRIPTION OF THE PREFERRED EMBODIMENTS

Figure 1:
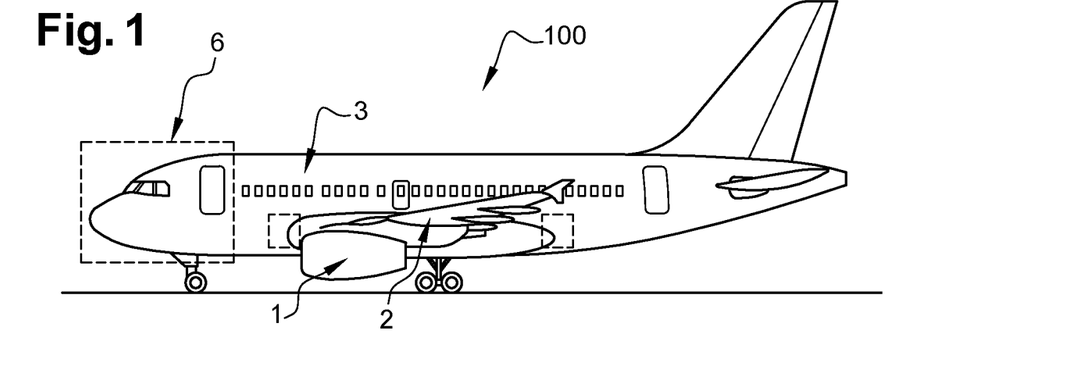
FIG. 1 represents a diagrammatic side view of an aircraft according to the invention.

Referring to FIG. 1, there is represented an aircraft 100 of the commercial aircraft type, comprising two wings 2 (only one visible in FIG. 1) fixed to a fuselage 3 and each carrying a bypass type turbomachine 1 such as a turbojet. On this aircraft 100 is provided a nose section 6 that is specific to the present invention and a preferred embodiment of which will be described later.

Figure 2:
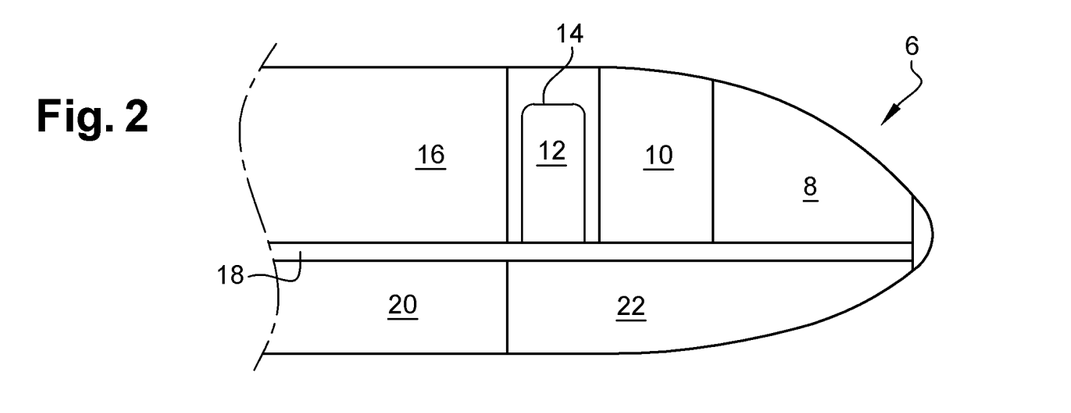
FIG. 2 represents a diagrammatic side view of a part of the aircraft shown in the previous figure, in particular its nose section.

FIG. 2 shows the nose section 6, the front upper part of which forms the cockpit 8. To the rear of the cockpit there is provided at least one toilet or toilet booth 10 specific to the invention. There are, for example, two toilets 10 arranged on respective opposite sides of the aircraft. To the rear of the toilets 10 is provided a passage 12 delimited in part by a front access door 14 mounted on the fuselage. This passage 12 leads toward the rear into a passenger cabin 16 in which the passenger seats (not shown) are located, this cabin being also referred to as the "cabin zone." The passenger cabin 16 is delimited at the bottom by a cabin floor 18 below which is a cargo zone 20. Finally, at the front of the cargo zone 20 and still under the floor 18 the nose section 6 comprises a lower technical zone 22 that extends under the cockpit 8.

Figure 3:
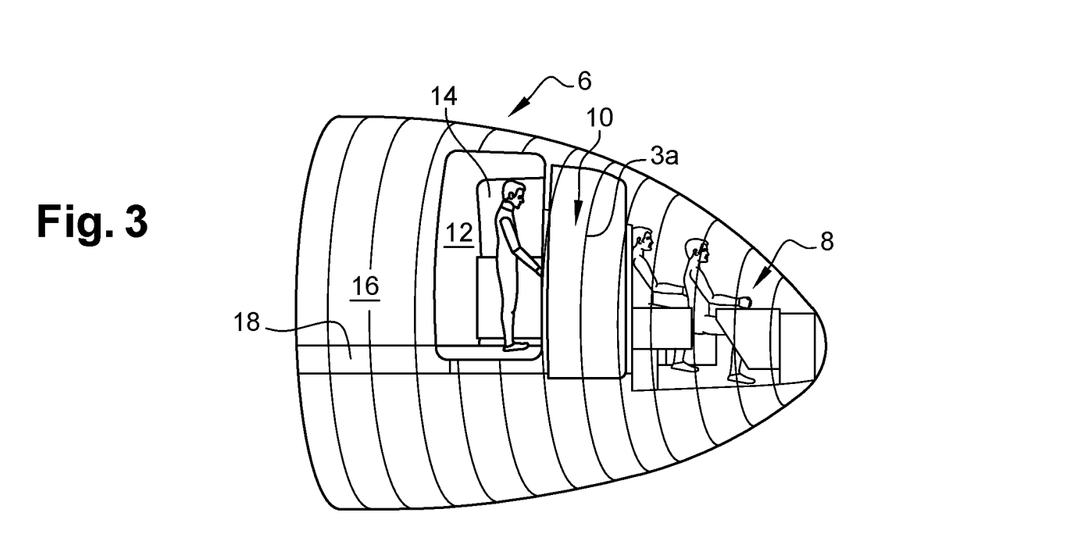
FIG. 3 represents a more detailed side view of the nose section shown in the previous figures.
Figure 4:
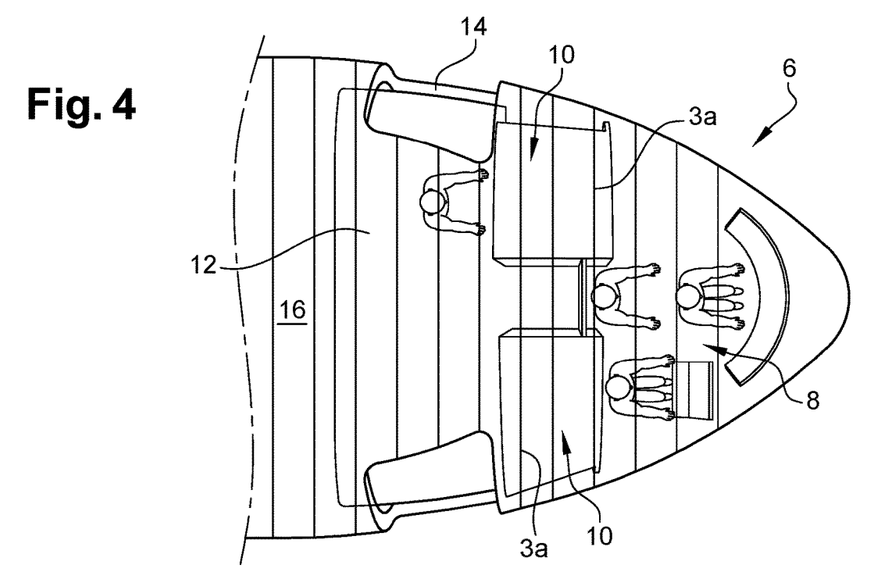
FIG. 4 represents a more detailed view from above of the nose section shown in the previous figures.

FIGS. 3 and 4 show the nose section 6 in more detail from different viewing angles. These two figures show that each toilet 10 is located at the level of a double curvature fuselage portion 3a, that is to say, a portion that, forwardly in the longitudinal direction of this aircraft, gets smaller both in the heightwise direction and in the transverse direction of the aircraft.

Figure 5:
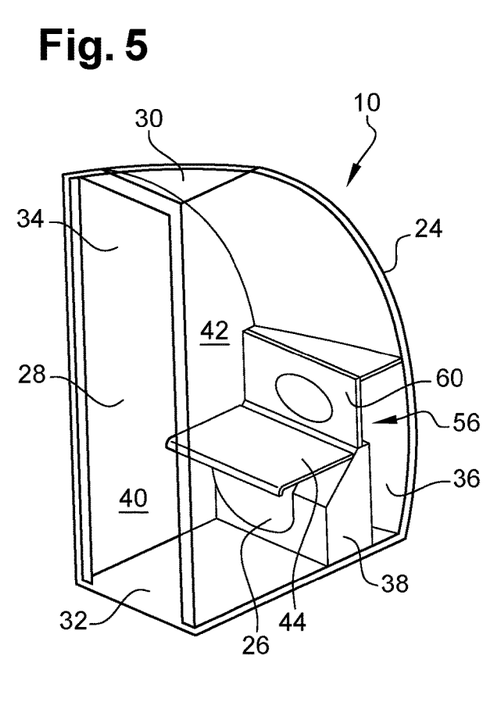
FIG. 5 represents a perspective view of one of the toilets shown in the previous figures in the configuration for use of the toilet bowl.
Figure 6:
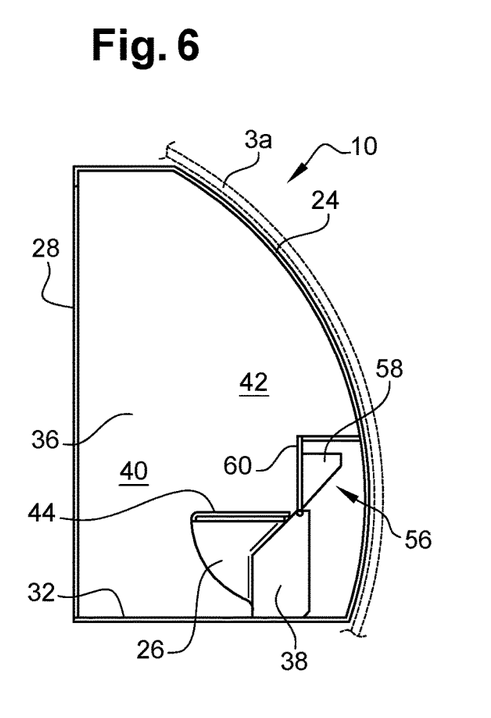
FIG. 6 represents a side view of the toilet shown in the previous figure.
Figure 7:
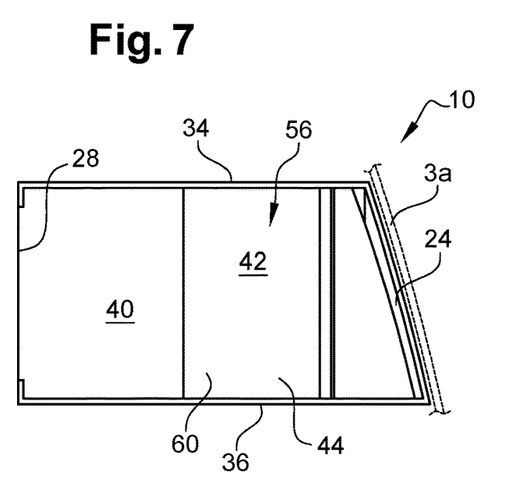
FIG. 7 represents a view from above of the toilet shown in FIGS. 5 and 6.

The toilet 10 shown in FIGS. 5 to 7 comprises a plurality of walls that delimit it, such as a rear wall 24. In this regard, it is indicated that in the remainder of the description of the toilet 10 the terms "front," "rear" and "lateral" are used relative to the orientation of a toilet bowl 26. Thus, the rear wall 24 of the toilet corresponds to the wall that covers the aforementioned fuselage portion 3a, corresponding to a lateral wall of this fuselage. The shape of this rear wall 24 follows the profile of the fuselage portion 3a that it covers and to which it is fixed. Consequently, the rear wall 24 has a double curvature shape similar to that of the fuselage portion 3a.

The rear wall 24 of the toilet faces a front wall 28 essentially formed by an access door that is preferably covered on the inside with a mirror. The front wall 28 is preferably planar.

The toilet 10 is also delimited by an upper wall 30, a floor 32 continuous with the floor of the passenger cabin, a first lateral wall 34 separating the toilet from the cockpit, and a second lateral wall 36 separating the toilet from the passenger cabin.

Inside the toilet 10 is provided the toilet bowl 26, the front of which is therefore oriented toward the front wall 28 and the rear of which is oriented toward the rear wall 24. The bowl 26 is supported at the front by a base 38 fixed to the floor 32. This base 38 may integrate a water feed and evacuation system. The bowl 26 and its base 38 are closer to the rear wall 24 than the front wall 28, thus exposing an interior front space 40 of the toilet in which a user can stand, facing the toilet bowl 26. This interior front space 40 corresponds to the area of the toilet that has the greatest height because of the double curvature seen on the rear wall 24 that reduces the height of a rear space 42 accommodating the bowl 26.

The toilet bowl 26 is equipped with a toilet seat and a lid 44. The lid 44 has a rectangular general shape, the length of which is oriented transversely relative to the bowl. In other words, the length of the lid 44 extends in the direction of separation of the two lateral walls 34, 36 of the toilet, with a dimension that is preferably substantially identical to the separation between those two walls 34, 36. This latter feature is seen best in FIG. 7.

The lid 44 may have a downwardly curved front edge. Its rear edge is for its part articulated to the bowl 26 or to its base 38 so that the lid 44 can be pivoted from a down position shown in FIGS. 5 to 7 to a raised position of use shown in FIG. 8, and vice versa.

Figure 9:
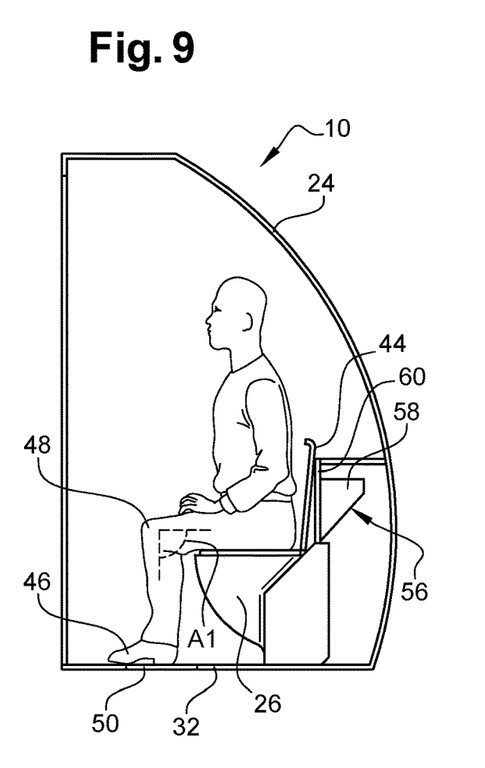
FIG. 9 is a side view of the toilet shown in FIG. 8 with a first user seated on the toilet bowl.
Figure 10:
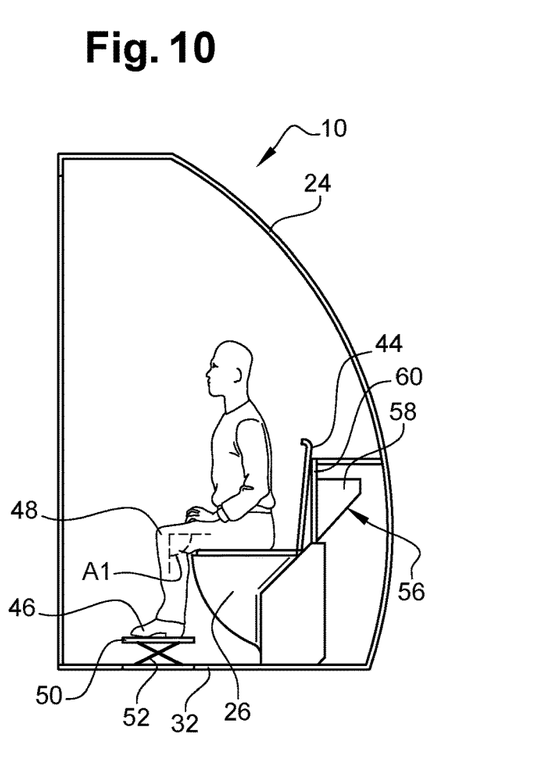
FIG. 10 is a side view similar to the previous one with a shorter second user seated on the toilet bowl.

The raised position of the lid 44 is also shown in FIGS. 9 and 10, which respectively show two persons of different height seated on the bowl 26. In the raised position the lid 44 entirely covers a washbasin 58 situated behind it in the retracted position. This enables the benefit of improved hygiene due to the protection of the washbasin 58 by the lid 44.

In FIG. 9, the user seated on the bowl 26 is tall, which allows them to rest their feet 46 on the floor 32 of the toilet with a satisfactory angle at the level of their knees 48. Here this angle is approximately 90° and is considered as physiologically satisfactory if it is in a range from for example 60 to 100° inclusive.

In the case of a shorter user, their feet 46 may not touch the floor 32 when they are seated on the bowl 26 and wish to preserve an acceptable angle at the level of their knees 48. This situation can be seen in FIG. 10, showing a functionality of the invention whereby a footrest 50 adapts to the height of the user.

To be more precise, the footrest 50 is integrated into the floor 32 and is in the same plane as the latter when it adopts a retracted position like that shown in FIG. 9. The footrest 50 nevertheless remains adjustable in height relative to the rest of the floor 32 thanks to a movement system 52 connecting it to the floor. This movement system 52 therefore enables adjustment of the height of the footrest 50, for example being controlled by the user with the aim of moving it to the required height, providing a rest for the feet 46 that places the knees at an acceptable angle A1. Alternatively, the toilet 10 may be equipped with a sensor device (not shown) for detecting one or more representative values of the angle A1 at the level of the knees 48 of the user seated on the bowl 26. As a function of the angle A1 detected in this way the footrest 50 may be moved automatically by the system 52 until the angle A1 adopts an acceptable, predetermined value stored in an automatic control system (not shown).

Figure 8:
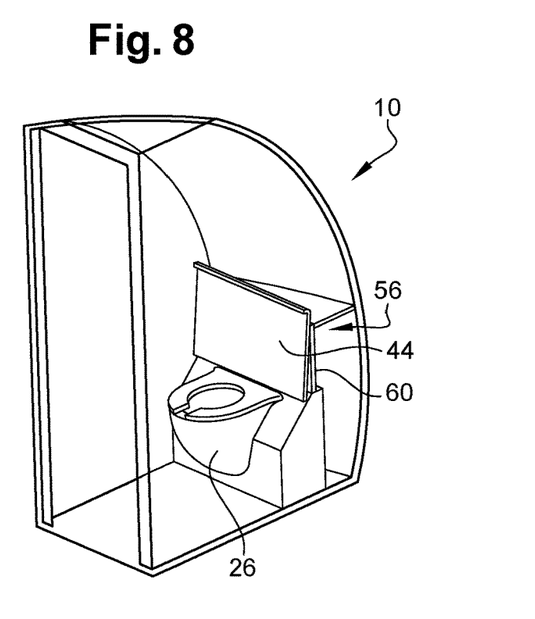
FIG. 8 is a perspective view similar to that of FIG. 5 with the bowl lid shown in the raised position for use of the bowl.

In the figures that have just been described, there is also represented a washbasin module 56 integrated into the toilet 10, situated to the rear of the toilet bowl 26, in the rear space 42. The washbasin module is therefore no longer situated laterally relative to the bowl 26 as in the prior art, but behind the latter. In all the previous figures, the washbasin module 56 adopts a retracted position placing the toilet 10 in a configuration for use of the bowl. In other words, in this configuration for use of the bowl, the washbasin module 56 while retracted rearwards is not usable. Moreover, when the toilet lid 44 adopts its raised position as shown in FIGS. 8 to 10 it entirely covers the washbasin module 56. This advantageously improves hygiene.

The washbasin module 56 includes the washbasin 58, also referred to as a bowl, as well as a washbasin table 60 disposed around the washbasin 58. The table 60 has a rectangular general shape the length of which is oriented transversely relative to the bowl. In other words, the length of the washbasin table 60 extends in the direction of separation of the two lateral walls 34, 36 of the toilet, with a dimension that is preferably substantially identical to the separation between these two walls 34, 36. This latter feature is seen best in FIG. 7.

As described later, the washbasin module 56 may also include a mobile washbasin cover and a tap, even though the latter could be arranged elsewhere in the toilet instead, while remaining close to the washbasin.

Figure 11:
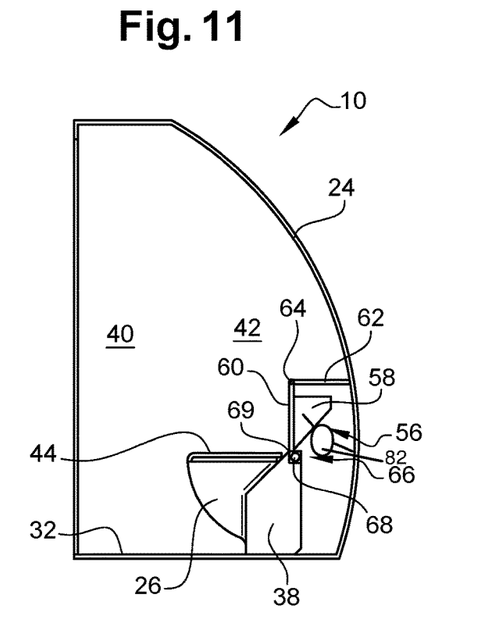
FIG. 11 represents a side view of the toilet shown in the previous figures in a configuration for use of the toilet bowl.

In the retracted position of the washbasin module 56, also represented in FIG. 11, the washbasin table 60 is situated to the rear relative to the toilet bowl 26. This table 60 is then preferably oriented vertically, so as to have the smallest possible overall size. At the level of a top edge of the table 60, the latter is mounted to be mobile in rotation on a horizontal shelf 62, itself mounted on the rear wall 24. The rotation axis 64 of the module 56 relative to the shelf 62 is parallel to the transverse direction of the toilet bowl 26. This rotation axis 64 is therefore parallel to the rotation axis of the toilet lid 44 and is intended to be parallel to a longitudinal axis of the aircraft integrating this toilet. It is noted that the rotation axis 64 that enables the module 56 to pivot downwards into its retracted position may be provided between this module 56 and the shelf 62 or directly between this module 56 and the rear wall 24 of the toilet, having a curved shape corresponding to that of the adjacent fuselage portion. As can be seen in FIG. 11, the module 56, in the retracted position, extends upwards and downwards relative to a point on the curved rear wall 24 defining the maximum width of the toilet 10 between its front and rear walls 28, 24. Consequently, in the retracted position, the module 56 is advantageously placed in the part of the toilet having the greatest width, thus giving the occupant more room.

In the retracted position of the module 56, the washbasin 58 is accommodated between the washbasin table 60 and the rear wall 24 of the toilet. This position from FIG. 11 preferably corresponds to that adopted by default, in which the user finds the toilet 10 on entering. They can then either raise the lid 44 or sit down in order to get ready.

Still in FIG. 11, there is shown a roller blind 66 that includes a fixed cassette 68 arranged to the rear of the bowl 26, for example inside an upper part of the base 38. The cassette 68 integrates the blind, one edge of which is fastened to a front part of the washbasin table 60. For example, this blind edge is fixed to the front edge surface 69 of the table 60, that front edge surface being disposed downwards in the FIG. 11 retracted position. In this position, the blind 66 is hardly unrolled and even remains entirely rolled up in the cassette 68, since the front edge surface 69 is substantially contiguous with the upper edge of the base 38.

Figure 12:
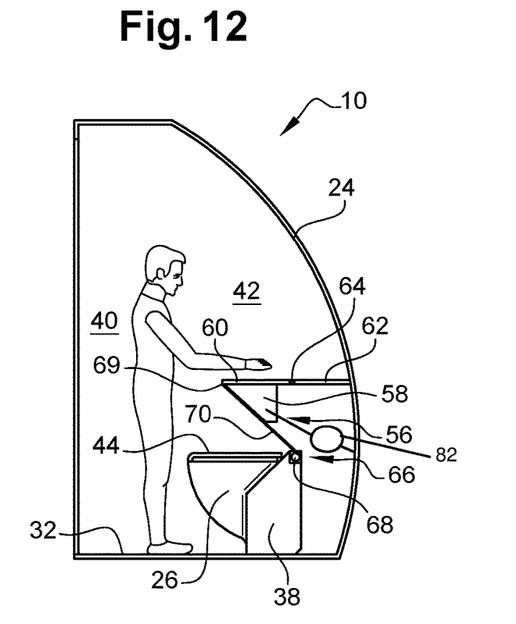
FIG. 12 represents a side view similar to the previous one with the toilet in a washbasin configuration.

Referring now to FIG. 12, it is shown that the washbasin module 56 can be moved from its retracted position to a deployed position in order to place the toilet 10 in a so-called "washbasin" configuration. The deployed position of the module 56 is obtained by causing it to pivot approximately 90° about the axis 64 so as to bring the washbasin table 60 into a substantially horizontal orientation. Because of this, the washbasin table 60 is continuous with the shelf 62 that supports it, so that the latter forms an extension of the washbasin table 60.

For its part, the washbasin 58 is arranged at least in part over the bowl 26, in the rear space 42. It is preferable that the whole of the washbasin 58 is located above the bowl 26, moreover rendering the latter unusable.

During movement of the washbasin module 56 from the retracted position to the deployed position, the blind 70 is progressively extracted from the cassette 68, by virtue of being pulled by its edge fastened to the front edge surface 69 of the table 60. The blind 70 therefore covers the washbasin 58 situated farther to the rear in the toilet.

The washbasin 58 may remain open at all times, but is then exposed to hygiene problems in the retracted position, because of its proximity to the bowl 26. Consequently, the washbasin 58 is preferably equipped with a cover 72 shown in FIG. 13. This cover 72 is mounted to be mobile relative to the table 60 so that it can be moved from a position covering the washbasin as shown in FIG. 13 to a retracted position providing access to the washbasin, as shown in FIG. 14.

Figure 13:
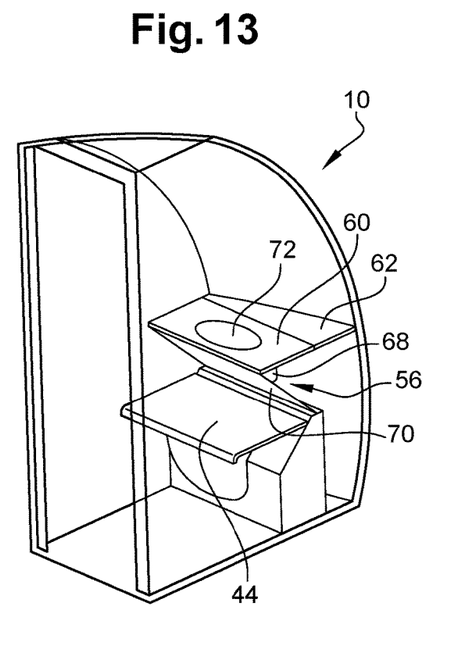
FIG. 13 represents a perspective view of the toilet in the washbasin configuration with the washbasin cover in the position covering the washbasin.
Figure 14:
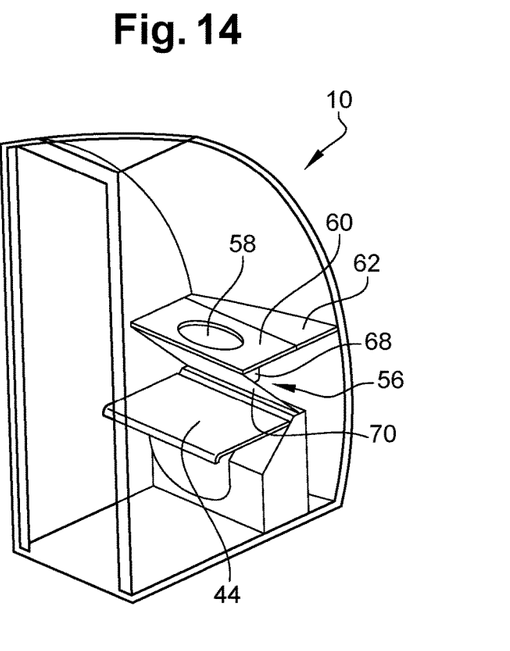
FIG. 14 represents a perspective view similar to the previous one with the washbasin cover in the position providing access to the washbasin.

In the FIG. 13 covering position, the cover 72 covers the washbasin 58, which enables the cover to form a baby changing table conjointly with the table 60 and the shelf 62. These three elements 72, 60, 62 are substantially in a common horizontal plane enabling them to form this baby changing table or any other worksurface.

On opening the cover 72, the latter is retracted, for example, into the thickness of the washbasin table 60. This cover 72 may be made in one part or in a plurality of separate parts.

Figure 15:
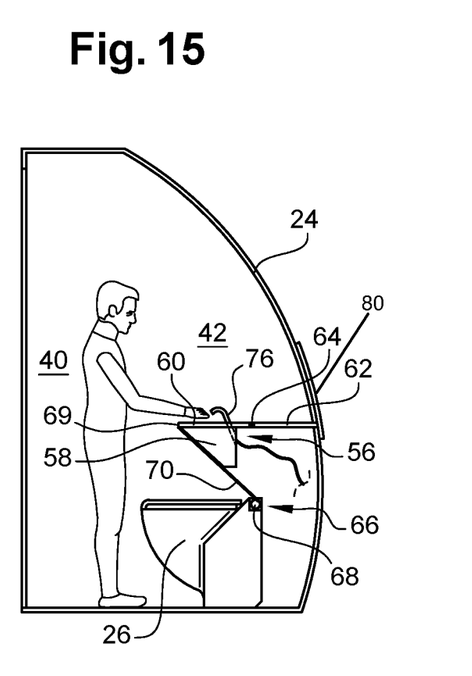
FIG. 15 represents a side view similar to that from FIG. 12 showing the washbasin tap in two distinct positions.
Figure 16:
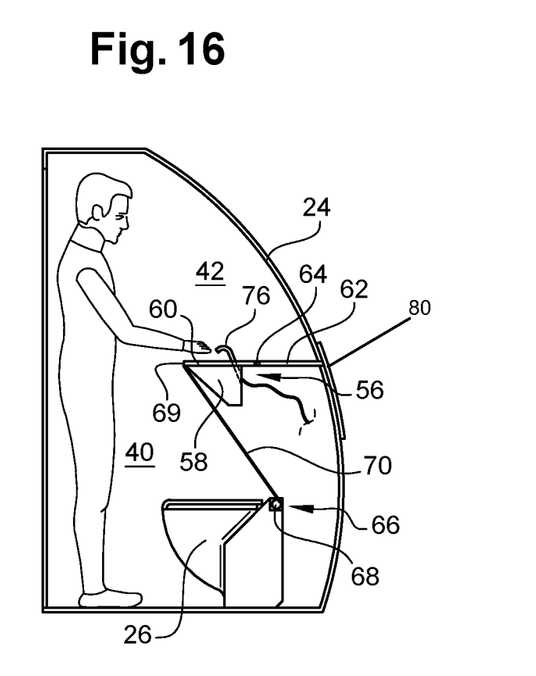
FIG. 16 represents a side view similar to the previous one with the washbasin module moved into a higher position than in the previous figure.

Once the cover 72 is open, the washbasin 58 can be used. It is associated with a tap that may be located on the shelf 62 or integrated into the washbasin module 56, as represented in FIGS. 15 and 16. Whichever embodiment is envisaged, the tap may be fixed in an immobile manner or in a mobile manner to the element that supports it.

For example, in the case of mounting the tap 76 on the washbasin 58 the tap may adopt a retracted position shown diagrammatically in dashed line in FIG. 15. In that position the tap 76 is inaccessible and does not extend beyond the opening at the top of the washbasin 58, in particular, in a manner such as to be able to close the cover of the washbasin.

The tap 76 may equally adopt a position of use in which it projects upwards above the top opening of the washbasin 58. This position of use is shown in solid line in FIG. 15.

However, as previously mentioned, the tap 76 may be mounted to be mobile or fixed at any other location of the toilet so as to enable the arrival of water in the washbasin 58 adopting its deployed position.

Finally, it is noted that the shelf 62 carrying the washbasin module 56 may be fixedly mounted on the rear wall 24 or mobile in height relative to the latter. In the latter case as shown in FIGS. 15 and 16 the shelf 62 is mounted to be mobile on a rail 80 extending along the rear wall 24 in the heightwise direction. In other words, the rail 80 has a single curvature and is described in a transverse plane of the aircraft. This assembly may also be moved by replacing the curved rail 80 with two rectilinear rails disposed so as to be slightly inclined on the lateral walls 34 and 36 of the toilet 10.

The shelf 62 and the washbasin module 56 can therefore be moved, as an assembly, upwards or downwards in the rear space 42 of the toilet to adapt to the height of the user standing in the front interior space 40. For example, in FIG. 16 the assembly 56, 62 is raised relative to its FIG. 15 position so as to suit a taller user.

This movement of the shelf 62, just like the movements of all the other mobile components described above, may be effected manually by the user. Alternatively, one or more movement systems 82 are provided to execute these movements of the washbasin module 56, the cover 72, the tap 76 or the shelf 62. These movement systems 82 employ conventional means such as motors. They may be controlled by the user or automatically by detection of the requirements of the user. In this latter case the toilet may be equipped with an automatic control system for all the movement systems.

Of course, various modifications may be made by the person skilled in the art to the invention that has just been described by way of nonlimiting example only and the scope of which is defined by the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft toilet comprising:
a toilet bowl, and
a washbasin,
the washbasin being is movably mounted in the toilet to be able to adopt at least two distinct positions relative to the toilet bowl, including:
a retracted position configured to bring the toilet into a configuration of use of the toilet bowl;
a deployed position configured to bring the toilet into a washbasin configuration, a position in which the washbasin is arranged above the toilet bowl,
wherein the toilet is configured so that the washbasin pivots downwards to go from the deployed position to the retracted position,
wherein the washbasin forms an integral part of a washbasin module also equipped with a washbasin table, the washbasin module being mobilely mounted so as to be able to adopt said at least two distinct positions relative to the toilet bowl, also by tilting downwards to go from the deployed position to the retracted position,
wherein the washbasin module is mounted to be mobile on a shelf that forms an extension of the washbasin table when the module adopts the deployed position.

2. An aircraft toilet comprising:
a toilet bowl, and
a washbasin,
the washbasin being is movably mounted in the toilet to be able to adopt at least two distinct positions relative to the toilet bowl, including:
a retracted position configured to bring the toilet into a configuration of use of the toilet bowl;
a deployed position configured to bring the toilet into a washbasin configuration, a position in which the washbasin is arranged above the toilet bowl,
wherein the toilet is configured so that the washbasin pivots downwards to go from the deployed position to the retracted position,
wherein the washbasin forms an integral part of a washbasin module also equipped with a washbasin table, the washbasin module being mobilely mounted so as to be able to adopt said at least two distinct positions relative to the toilet bowl, also by tilting downwards to go from the deployed position to the retracted position, and
a roller blind featuring a fixed cassette arranged to the rear of the toilet bowl and a blind edge fastened to a front part of the washbasin table.

3. The toilet according to claim 1, wherein the washbasin module is equipped with a washbasin cover mounted to be mobile relative to the washbasin table between two distinct positions, including:
a position covering the washbasin enabling formation, conjointly with the washbasin table, of a baby changing table;
a retracted position giving access to the washbasin.

4. The toilet according to claim 1, wherein the washbasin module is also equipped with a tap.

5. The toilet according to claim 4, wherein the tap is mounted to be mobile to be able to adopt two distinct positions relative to the washbasin, including:
a retracted position rendering the tap inaccessible;
a position for use of the tap.

6. The toilet according to claim 1, wherein the shelf is mounted on a rear wall of the toilet in a fixed manner.

7. The toilet according to claim 1, wherein the shelf is mounted on a rear wall of the toilet, vertically mobile.

8. The toilet according to claim 2, wherein the washbasin module is mounted to be mobile in rotation.

9. The toilet according to claim 8, wherein the washbasin module is rotatable about a rotation axis parallel to a transverse direction of the toilet bowl.

10. The toilet according to claim 1, wherein in the retracted position of the washbasin module, the washbasin table is situated behind the toilet bowl.

11. The toilet according to claim 10, wherein the washbasin table, in the retracted position of the washbasin module, is arranged vertically relative to the toilet bowl.

12. The toilet according to claim 1, further comprising a lid covering the toilet bowl, the lid preferably having a rectangular general shape, a longer side of which is oriented transversely relative to the toilet bowl.

13. The toilet according to claim 1, further comprising a floor comprising a height-adjustable footrest.

14. The toilet according to claim 13, wherein the toilet is configured so that the footrest is adjustable in height by a user.

15. The toilet according to claim 13, wherein the toilet is configured so that the footrest is adjustable in height automatically as a function of an angle formed at a level of knees of a user sitting on the toilet bowl.

16. An aircraft nose section comprising at least one toilet according to claim 1, the toilet comprising a rear wall, a shape of which follows a profile of a double curvature fuselage portion covered by the toilet rear wall.

17. An aircraft comprising at least one toilet according to claim 1.

* * * * *